US008356959B2

(12) United States Patent
Ganguli et al.

(10) Patent No.: US 8,356,959 B2
(45) Date of Patent: Jan. 22, 2013

(54) SYSTEM FOR MITIGATING MARINE BIO-FOULING OF AN UNDERWATER STRUCTURE

(75) Inventors: Rahul Ganguli, Oak Park, CA (US); Vivek Mehrotra, Simi Valley, CA (US)

(73) Assignee: Teledyne Scientific & Imaging LLC, Thousand Oaks, CA (US)

( * ) Notice: Subject to any disclaimer, the term of this patent is extended or adjusted under 35 U.S.C. 154(b) by 269 days.

(21) Appl. No.: 12/572,010

(22) Filed: Oct. 1, 2009

(65) Prior Publication Data

US 2011/0081207 A1    Apr. 7, 2011

(51) Int. Cl.
*B63B 59/00* (2006.01)
(52) U.S. Cl. .............. 405/216; 114/67 R; 114/222
(58) Field of Classification Search ............ 405/211, 405/216; 114/67 R, 232
See application file for complete search history.

(56) References Cited

U.S. PATENT DOCUMENTS

| | | | | |
|---|---|---|---|---|
| 3,497,990 | A | * | 3/1970 | Jeffries ................... 43/131 |
| 3,505,758 | A | | 4/1970 | Willisford |
| 3,661,506 | A | | 5/1972 | Watkins |
| 3,680,516 | A | * | 8/1972 | Loverdos-Stelakatos .. 114/67 R |
| 4,644,021 | A | | 2/1987 | Toda et al. |
| 4,675,051 | A | | 6/1987 | Baxter |
| 4,881,566 | A | * | 11/1989 | Ubels et al. ................. 137/13 |
| 5,354,603 | A | * | 10/1994 | Errede et al. ............... 442/361 |
| 6,605,570 | B2 | | 8/2003 | Miller et al. |
| 2005/0069519 | A1 | | 3/2005 | Osada et al. |
| 2006/0144286 | A1 | | 7/2006 | Baum |
| 2008/0026026 | A1 | | 1/2008 | Lu et al. |

FOREIGN PATENT DOCUMENTS

JP    2006070104 A    3/2006

OTHER PUBLICATIONS

Efimenko, et al.; Development and Testing of Hierarchically Wrinkled Coatings for Marine Antifouling; ACSAMI; 2009; pp. 1031-1040; vol. 1—No. 5.
Callow et al., Marine Biofouling: A Sticky Problem, Biologist, 2002, pp. 1-5, 49(1).
Shikata, et al., Viscoelastic Behavior of Aqueous Srfactant Micellar Solutions, Korea-Australia Rheology Journal, 2002, pp. 129-138, 14(3).

* cited by examiner

*Primary Examiner* — Tara Mayo-Pinnock
*Assistant Examiner* — Benjamin Fiorello
(74) *Attorney, Agent, or Firm* — Glenn H. Lenzen; Husch Blackwell LLP

(57) ABSTRACT

A biomimetic system for mitigating marine bio-fouling is disclosed which is based upon the sacrificial skin mechanism found in the pilot whale species. The anti-bio-fouling system is characterized by the continuous in-situ underwater formation of a conformal protective skin around a submerged object or structure and employs a circulatory system embedded in a diffuser layer conformably fitted and secured to the structure to controllably deliver a sacrificial skin-forming material to the structural surface. The system advantageously utilizes the unique chemical properties of the skin-forming material to alter the material's viscosity in response to contact with sea water such that the material is uniformly distributed over the structure surface by a self-diffusion process, notwithstanding structural configuration or gravitational orientation, thus forming a stabilized waterproof layer or sacrificial skin. The sacrificial skin controllably self-dissolves and is shed in response to continuous contact with sea water, thereby carrying away the marine bio-fouling material.

11 Claims, 1 Drawing Sheet

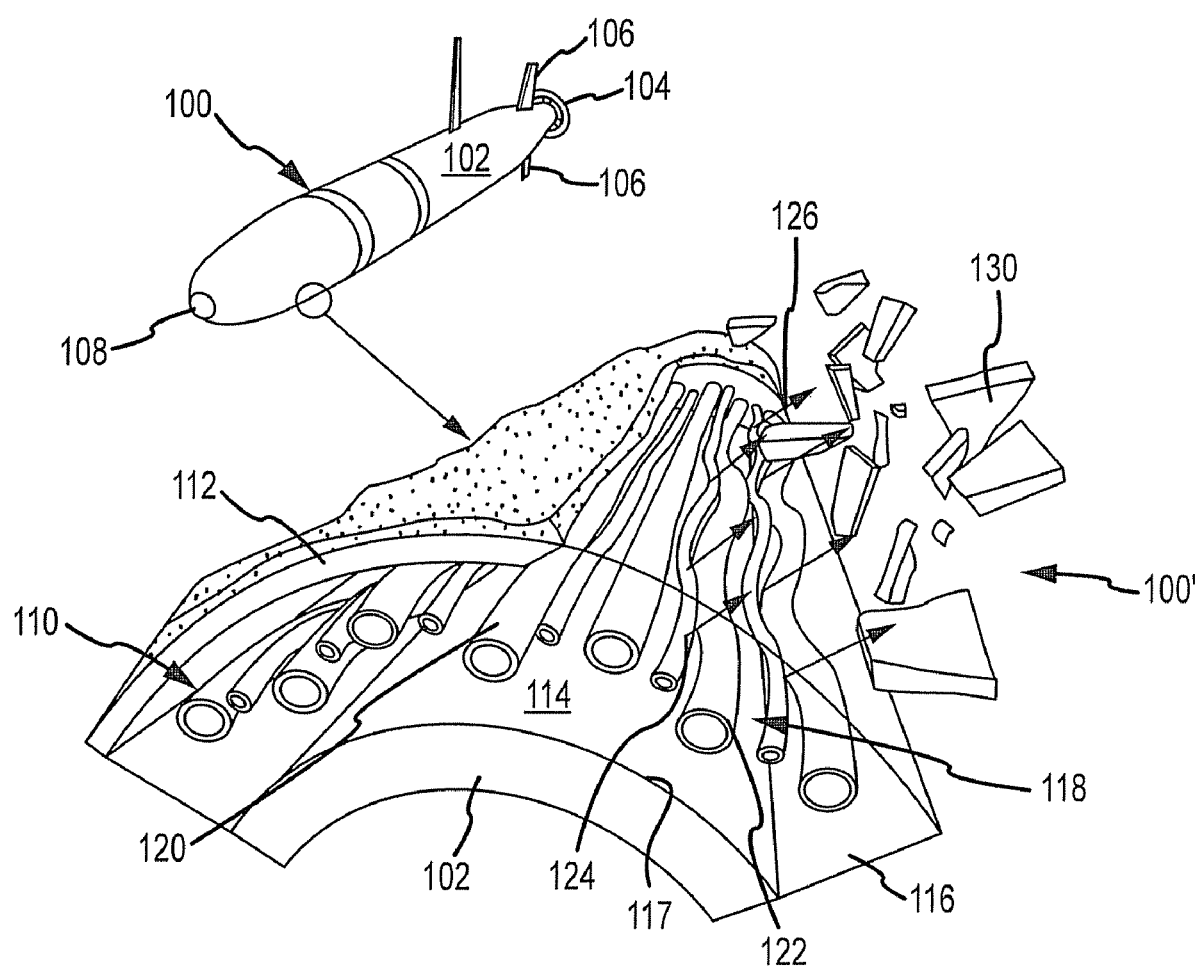

SYSTEM FOR MITIGATING MARINE BIO-FOULING OF AN UNDERWATER STRUCTURE

RIGHTS OF THE U.S. GOVERNMENT

This invention was made with support of the United States Government under Contract No. FA9550-07-C-0011 awarded by the U.S. Air force, Office of Scientific Research (AFOSR) to Teledyne Scientific & Imaging, LLC. The Government has certain rights in the invention.

FIELD OF THE INVENTION

The present invention relates generally to marine bio-fouling of underwater structures. More specifically, the present invention relates to a system and antibio-fouling materials for mitigating the bio-fouling of submerged structures.

BACKGROUND OF THE INVENTION

Marine bio-fouling of submerged surfaces has been a problem encountered by ship builders, fishermen, seamen and shipping company operators for centuries. Marine organisms attach themselves to ship hulls, anchor chains, fishing equipment and the like with remarkable rapidity once the object is placed in the water. The fouling phenomenon is particularly troublesome in salt water environments where marine organisms such as barnacles can attach themselves to submerged objects in successive layers to the point that the original object becomes virtually unrecognizable over time.

The growth of marine organisms on the submerged portion of a ship's hull, by way of example, significantly increases the drag on the hull as it moves through the water, thus increasing fuel consumption and reducing the overall efficiency of the ship's operation. In the past, ships were routinely placed in dry dock for scraping and painting. Various coatings designed to prevent and/or slow the rate of growth of marine organisms have been developed over the years. Some of these coatings include copper-based paints, silicone coatings, gradually dissolving coatings, and the use of certain toxins designed to kill the marine organisms before they can adhere to a submerged object. Examples of such prior art systems may be found in U.S. Pat. No. 3,497,990 issued to F. A. Jeffries on Mar. 3, 1970 for "Cellular Antifouling Covering for Submerged Marine Objects" and in U.S. Pat. No. 3,505,758 issued to L. H. Willisford on Apr. 14, 1970 for "Antifouling Covering for Submerged Marine Objects".

A more recent approach to the bio-fouling problem may be found in an article authored by Efimenko et al. entitled "Development and Testing of Hierarchically Wrinkled Coatings for Marine Antifouling", American Chemical Society, Applied Materials & Interfaces, vol. 1, No. 5, pp. 1031-1040, April, 2009. This article explores the application of hierarchically wrinkled surface topographies (HWST) to prevent marine bio-fouling and is based upon the premise that smaller surface topological features present fewer points of attachment for marine bio-organisms. However, this work is in its early stages and conclusive results as to its long-term effectiveness in a sea water environment are, as yet, unavailable.

Most notable of the anti-bio-fouling toxins is the antifouling coating tributylin, which has now been banned from use in most areas due to the severe toxicity to marine mammals and other marine life forms. With respect to the silicone and other types of coatings, a certain shear force was required to release the bio-foulants, and it has been found that at speeds of less than approximately three knots, shear forces acting on the layers are too weak to cause removal of the fouling material. In particular, in littoral areas where the water is relatively stagnant, stationary sensor arrays placed along sea coasts to detect potentially hostile submarine threats are particularly vulnerable to bio-fouling. Prior art anti-fouling coatings have been found to be ineffective in addressing bio-fouling of such sensors, and, as in the case of towed sensors and sensor-equipped unmanned underwater vehicles (UUV's) and autonomous underwater vehicles (AUV's), such coatings cannot be applied to the sensor cover without severely reducing or completely destroying its effectiveness.

Hence a need exists for a material system which eliminates or materially reduces the bio-fouling of underwater structures without introducing toxic chemicals into the environment. More specifically, a need exists for a material system which eliminates or materially reduces bio-fouling of sensor-equipped UUV's and AUV's without inhibiting the effectiveness of the electronic sensor systems with which such devices are equipped.

SUMMARY OF THE INVENTION

The present invention overcomes the problems set forth above and which remain unaddressed in the prior art by providing a biomimetic system for mitigating marine bio-fouling which is based upon the sacrificial skin mechanism found in the pilot whale species. The anti-bio-fouling system disclosed herein, which is characterized by the continuous in-situ underwater formation of a conformal protective skin around an submerged object or structure, employs a circulatory system embedded in a diffuser layer conformably fitted and secured to the structure to controllably deliver a sacrificial skin-forming material to the structural surface. The system advantageously utilizes the unique chemical properties of the skin-forming material to alter the material's viscosity in response to contact with sea water such that the material is uniformly distributed over the structure surface by a self-diffusion process, thus forming a stabilized waterproof layer or sacrificial skin. The sacrificial skin controllably self dissolves in response to continuous contact with sea water and is shed from the structure, thereby carrying away the marine bio-fouling material.

These and other advantages and novel features of the present invention will become apparent from the following description of the invention when considered in conjunction with the accompanying figures.

BRIEF DESCRIPTION OF THE DRAWINGS

FIG. 1 is a perspective view of an underwater structure having a portion of the surface thereof enlarged to illustrate the marine bio-fouling mitigation system of the present invention.

DETAILED DESCRIPTION

It should be noted that the present description is by way of instructional examples, and the concepts presented herein are not limited to use or application with any single anti-bio-fouling system or submerged structure. Hence, while the details of the innovation described herein are for the convenience of illustration and explanation with respect to exemplary embodiments, the principles disclosed may be applied to other types and applications of marine bio-fouling mitigation systems without departing from the scope hereof.

Referring now to FIG. 1, the novel concept of a sacrificial skin to prevent or mitigate marine bio-fouling of underwater structures in accordance with the present invention is illustrated in greater detail. An underwater structure is illustrated generally at 100, which, for purposes of explanation, is shown in the form of an unmanned underwater vehicle (UAV). The UAV 100 includes a body or housing portion 102, a propulsion element 104, control surfaces 106, and a sensor window or aperture 108.

An enlarged cross section of the housing 102 incorporating a marine bio-fouling mitigation system in accordance with the instant disclosure is shown at 100'. The bio-fouling mitigation system 110 includes means 114 for forming a conformal sacrificial skin 112 on the surface 102 of the UAV. The skin forming means 114 includes a diffuser layer 116 which is conformably fitted and secured to the surface 117 of body portion 102 and a circulatory system 118 formed or embedded in the diffuser layer and adapted to deliver and release into the diffuser layer a skin-forming material.

In the embodiment shown, the circulatory system includes a plurality of delivery channels or tubes 120 which may be formed or embedded in the diffuser layer. Each of the delivery channels has a substantially longitudinal body portion 122 and a plurality of spaced-apart apertures 124 formed in the body portion of each delivery channel and adapted to deliver the skin-forming material to the diffuser. The delivery of the skin-forming material is illustrated in FIG. 1 representatively by the arrows 126 emanating from the transverse apertures 124.

The diffuser layer 116 is formed of a porous material, by way of example and not by limitation, a porous polyurethane material. However, other porous materials such as one or more metallic wire mesh screens placed a uniform distance from the surface 117 may be employed as a diffuser layer without departing from the scope of the present invention.

The skin-forming materials were selected based upon their responses to contact with sea water, their viscosity properties and their energy transmission properties based upon the application to sensor aperture coverings. Traditional antifouling coatings cannot be used over sensor aperture coverings or windows due to their opacity.

Two types of materials that increase in viscosity upon exposure to sea water were found to be suitable for skin formation. The first type of material was selected from a group of anionic surfactants, and more specifically, a commercially available surfactant developed and marketed by Weatherford Chemicals, Inc. under the trade name Visco-Elastic Surfactant (VES). This proprietary anionic surfactant undergoes a salinity-driven increase in viscosity and is used in oil exploration to viscosify salty water. The second type of material was selected from a group of cationic, high molecular weight, polyacrylamide-based emulsions used to viscosify HCI in the oil exploration industry. Specifically, the material known commercially as Acid Gelling Agent, also developed and marketed by Weatherford Chemicals, Inc. under the trade name AGA-400ME met the performance requirements of the instant application.

In-situ skin formation under water was found to be highly correlated to a combination of a rapid rise in skin-formation material viscosity upon contact with sea water and a large total magnitude of viscosity increase. Pure VES material showed a rapid rise in viscosity when contacted with sea water; however, the magnitude of the viscosity increase was limited to approximately 40%. The AGA material, on the other hand, displayed a six-fold increase in viscosity, but the viscosity increase was relatively slow. Neither material alone exhibited skin formation ability over large surface areas. However, a mixture of VES and AGA resulted in uniform skin formation and displayed both a rapid increase in viscosity and a high total increase in viscosity. Experiments with various ratios of the two components revealed that acceptable results may be obtained using a mixture of approximately 90 to 99% by weight VES and approximately 1 to 10% by weight AGA. In a preferred embodiment, the mixture comprises approximately 97% by weight VES and approximately 3% by weight AGA.

In application, the VES/AGA mixture in liquid form is introduced to and disbursed through the diffusion layer 116 via the circulatory system 120. As the mixture flows outwardly through the apertures 124 as indicated by arrows 126 in FIG. 1, it comes into contact with sea water, undergoes a rapid viscosity change, and essentially plugs the diffuser layer in the vicinity around the transverse aperture, thereby initiating skin formation. The liquid entraining behind, not having come in contact with sea water, retains its original low viscosity and is forced to flow around the plugged region in a process called self-diversion. This material occupies the area adjacent to the initially formed skin portion, comes into contact with sea water and undergoes a rapid change in viscosity. Hence, a water tight skin of uniform thickness develops about the entire surface of the submerged object irrespective of angular or gravitational orientation or surface configuration, including sensor aperture coverings, the efficiency of which is not adversely impacted due to the energy transmission properties of the material.

The dissolution of the skin is as important a characteristic as its formation for the overall function of the sacrificial skin-based bio-fouling mitigation system. Experiments revealed that a skin formed from the 3% AGA VES mixture stabilizes for approximately six hours after its initial exposure to sea water, after which time the viscosity of the skin layer begins to decrease. In other words, the skin begins to dissolve and breaks away from the diffuser layer as shown by the fragmentary pieces 130 of the skin separating from the underlying structure in FIG. 1. As the skin dissolves and breaks away or sheds, it carries with it any bio-fouling materials which may have formed thereon during the period of stable viscosity. Hence, it may be appreciated that the sacrificial skin formation and shedding or dissolution process is continuous, and as the skin breaks away from the structure it is protecting, it is replaced by a newly formed layer which, in turn following its period of stability, is, itself, shed from the structure.

The addition of polymerization enhancers to the skin-forming material may be employed to adjust the period of stability from approximately six hours to as long as approximately seventy-two hours, thereby permitting adjustment of the sacrificial skin properties to specific application and situational requirements. Similarly, the dissolution times may be adjusted via the addition of alcohols to the mixture. By way of example, tests revealed that if ethanol is introduced into the skin-forming process via the same inlet aperture as the skin-forming material, the dissolution proceeds at a much faster rate. A faster dissolution time may be advantageous in treating UUV's and AUV's equipped with sensors or stationary sensing structures where sensor readings must be taken at short intervals. The faster dissolution time permits more frequent sensor readings to be obtained through apertures which are free of bio-fouling materials. On the other hand, longer dissolution times may be desired where skin-forming material must be conserved, as in the case of vehicle hull applications.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A sacrificial skin system comprising:
a skin-forming material including a mixture that increases in viscosity upon exposure to sea water;
a porous diffuser layer having an exterior and an interior, the exterior including the skin-forming material at a first viscosity level, the exterior having a period of limited stability at the first viscosity level, the porous diffuser layer being configured to receive the skin-forming material at a second viscosity level, the first viscosity level being higher than the second viscosity level; and
a plurality of delivery channels each having a longitudinal body portion with the skin-forming material at the second viscosity level therein and a plurality of apertures extending transversely through the body portion, through which the skin-forming material flows at the second viscosity level, the delivery channels being embedded in the interior of the porous diffuser layer to expose the skin-forming material to sea water as the skin-forming material flows from the apertures into the diffuser layer.

2. The system of claim 1 wherein the mixture comprises an anionic surfactant and a cationic, high molecular weight, polyacrylamide-based emulsion.

3. The system of claim 2 wherein the mixture comprises from approximately 90% to approximately 99% by weight anionic surfactant and from approximately 1% to approximately 10% by weight cationic, high molecular weight, polyacrylamide-based emulsion.

4. The system of claim 3 wherein the mixture comprises approximately 97% by weight anionic surfactant and approximately 3% by weight cationic, high molecular weight, polyacrylamide-based emulsion.

5. The system of claim 1 wherein the mixture includes a polymerization enhancer to defer dissolution of the skin-forming material.

6. The system of claim 1 wherein the mixture includes a viscosity reducing agent to advance dissolution of the skin-forming material.

7. The system of claim 6 wherein the viscosity reducing agent comprises an alcohol.

8. The system of claim 7 wherein the alcohol is ethanol.

9. The system of claim 1 wherein the porous diffuser layer comprises polyurethane.

10. The system of claim 1 wherein the porous diffuser layer comprises a metallic mesh screen.

11. The system of claim 1 wherein the skin-forming material forms a waterproof layer at the porous diffuser layer.

* * * * *